United States Patent
Chatte et al.

(10) Patent No.: US 8,418,925 B2
(45) Date of Patent: Apr. 16, 2013

(54) METHOD OF PROCESSING MAIL HAVING MULTIPLE IDENTIFIERS

(75) Inventors: Fabien Chatte, Nogent sur Marne (FR); Romain Pillard, Avon (FR)

(73) Assignee: Neopost Technologies, Bagneux (FR)

( * ) Notice: Subject to any disclaimer, the term of this patent is extended or adjusted under 35 U.S.C. 154(b) by 652 days.

(21) Appl. No.: 12/604,825

(22) Filed: Oct. 23, 2009

(65) Prior Publication Data

US 2010/0112205 A1 May 6, 2010

(30) Foreign Application Priority Data

Oct. 28, 2008 (FR) ...................................... 08 57315

(51) Int. Cl.
G06K 19/00 (2006.01)
G06K 7/10 (2006.01)
G06K 15/00 (2006.01)
G06K 7/14 (2006.01)
G06K 7/01 (2006.01)
G06F 17/00 (2006.01)
B65B 35/00 (2006.01)
G07B 17/02 (2006.01)
G06Q 20/00 (2012.01)

(52) U.S. Cl.
USPC ................ 235/487; 235/462.01; 235/462.13; 235/378; 235/454; 235/382.5; 705/406; 705/401; 705/60

(58) Field of Classification Search ............. 235/462.01, 235/487, 378, 454, 462.13, 382.5; 705/60, 705/401, 406; 118/58; 427/226
See application file for complete search history.

(56) References Cited

U.S. PATENT DOCUMENTS

| | | | | |
|---|---|---|---|---|
| 4,191,376 A * | 3/1980 | Goldman et al. | ............. | 273/139 |
| 4,268,817 A * | 5/1981 | Simjian | ......................... | 705/403 |
| 4,632,252 A * | 12/1986 | Haruki et al. | ................. | 209/546 |
| 4,641,753 A * | 2/1987 | Tamada | ......................... | 209/546 |
| 4,757,189 A * | 7/1988 | Daboub | ......................... | 235/462.13 |
| 4,933,706 A * | 6/1990 | Abumehdi | ..................... | 355/400 |
| 5,042,843 A * | 8/1991 | Kuhns et al. | ................. | 283/109 |
| 5,177,368 A * | 1/1993 | Kay | ................................ | 250/566 |
| 5,189,442 A * | 2/1993 | Herbert | ............................. | 347/2 |
| 5,249,687 A * | 10/1993 | Rosenbaum et al. | ......... | 209/3.3 |
| 5,431,288 A * | 7/1995 | Nishijima et al. | ........... | 209/584 |
| 5,607,063 A * | 3/1997 | Nishijima et al. | ........... | 209/584 |
| 5,880,453 A * | 3/1999 | Wang et al. | .............. | 235/462.01 |
| 5,884,293 A * | 3/1999 | Herbert | ......................... | 705/408 |
| 6,102,592 A * | 8/2000 | Herbert | ......................... | 400/106 |
| 6,318,265 B1 * | 11/2001 | Sobel et al. | .................... | 101/483 |
| 8,152,068 B2 * | 4/2012 | Sanchez et al. | .......... | 235/462.01 |
| 2001/0008164 A1 * | 7/2001 | Sano et al. | ..................... | 156/221 |
| 2005/0128244 A1 * | 6/2005 | Kulpa et al. | ..................... | 347/35 |
| 2005/0184140 A1 * | 8/2005 | DeLa Vergne | ................ | 229/301 |

(Continued)

FOREIGN PATENT DOCUMENTS

| | | |
|---|---|---|
| DE | 199 16 363 A1 | 10/2000 |
| EP | 0 641 610 A2 | 3/1995 |
| EP | 0 856 816 A2 | 8/1998 |

*Primary Examiner* — Daniel Walsh
(74) *Attorney, Agent, or Firm* — Sughrue Mion, PLLC

(57) ABSTRACT

A method of processing a mailpiece that bears identifiers for postal use and identifiers other than for postal use, in which method said identifiers other than for postal use are printed on the mailpiece prior to it being fed into a franking machine suitable for printing a postal imprint on the mailpiece, wherein the identifiers other than for postal use are printed in an ink that is erased after the process of printing said postal imprint.

13 Claims, 1 Drawing Sheet

U.S. PATENT DOCUMENTS

2009/0073507 A1* 3/2009 Fukuda .................... 358/474
2009/0166438 A1* 7/2009 Sanchez et al. ............ 235/494
2010/0100233 A1* 4/2010 Lu ............................. 700/226

* cited by examiner

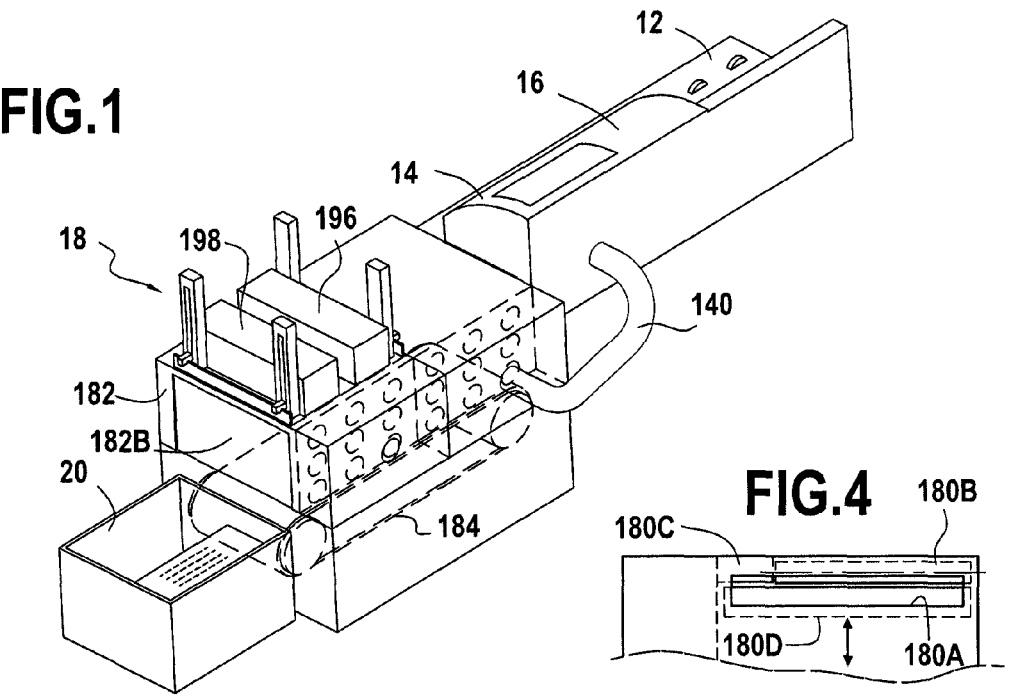
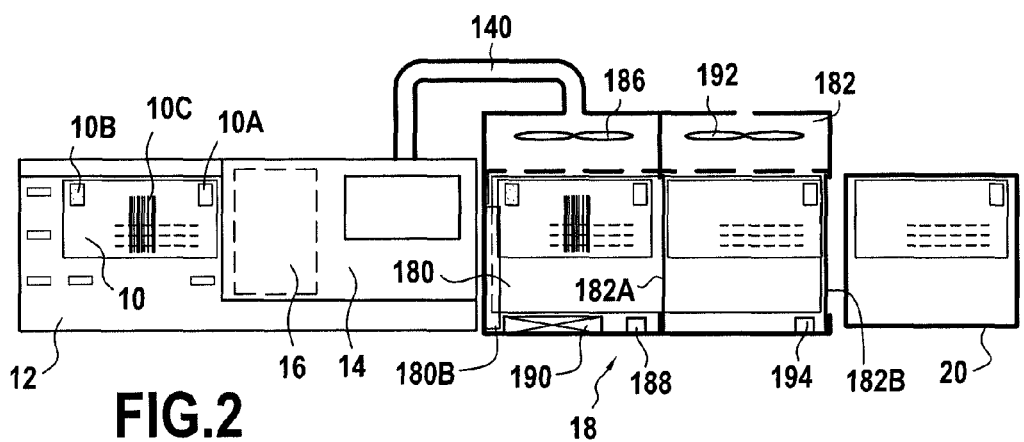
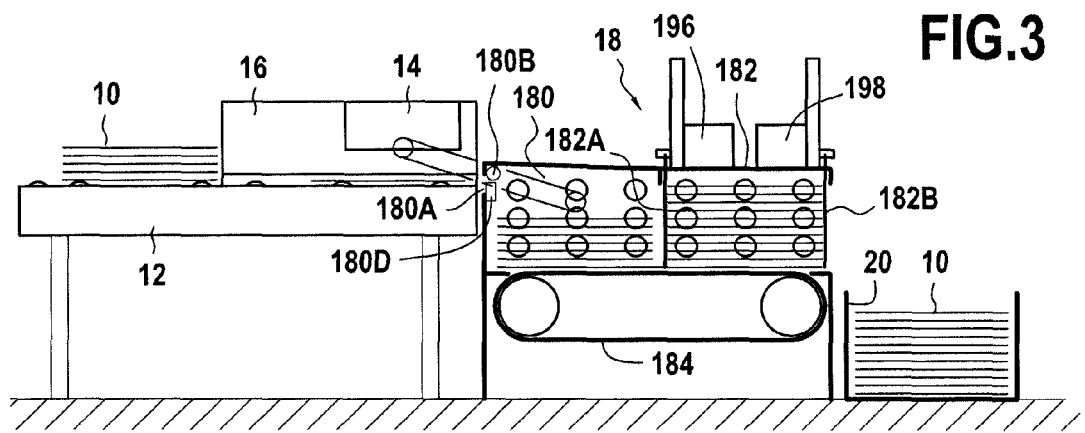

METHOD OF PROCESSING MAIL HAVING MULTIPLE IDENTIFIERS

CROSS REFERENCE TO RELATED APPLICATION

This application claims the foreign priority benefit of French Patent Application No. 0857315 filed Oct. 28, 2008, the contents of which is incorporated herein by reference in their entirety.

FIELD OF THE INVENTION

The present invention relates to the field of mail handling, and it relates more particularly to a method designed to facilitate processing by the postal authority of the various identifiers for postal use that are put on mailpieces when postal imprints are printed on them by a franking machine or "postage meter".

PRIOR ART

Nowadays, firms wish to assess with increasing precision the costs generated by each of their departments in order to estimate the intrinsic cost-effectiveness of each department. Since in order to calculate such costs it is necessary to know the amounts of the franking or the "postage amounts" that can be attributed to each department, it has become necessary to print identifiers on mailpieces, those identifiers making it possible to achieve such attribution as the mailpieces go through the franking machine. In addition, in particular in order to simplify the structures of franking machines, it is common also to use other, more specific identifiers also placed on the mailpieces, such as a bar code representing the format of the mailpiece.

Unfortunately, the presence on the mailpiece of all of these identifiers does not facilitate subsequent recognition by the postal authority which then finds it very difficult to find its own codes (e.g. the POSTNET or PLANET codes for postal use) from among the multitude of identifiers for in-house use (and that are of no use to the postal authority) also present on the mailpieces. That results in the sender losing money if it has not been possible for the postal codes to be recognized, thereby preventing the mail from reaching its recipient or, more often, in the postal authority wasting time since it is forced to process such mailpieces manually.

Therefore, a solution is currently being sought that satisfies both the need of the postal authority which requires a number of identifiers that is limited to postal identifiers only, and also the needs of businesses which, on the contrary, require multiple identifiers for multiple in-house uses.

OBJECT AND DEFINITION OF THE INVENTION

An object of the present invention is thus to propose a novel mail processing method that satisfies both of these entirely contradictory needs.

This object is achieved by a novel method of processing a mailpiece that bears identifiers for postal use and identifiers other than for postal use, in which method said identifiers other than for postal use are marked in heat-sensitive ink on said mailpiece prior to it being fed into a franking machine suitable for printing a postal imprint on said mailpiece, wherein said identifiers other than for postal use are erased after the process of printing said postal imprint, once said mailpiece has been ejected from said franking machine, by heating said mailpiece to above a predetermined temperature, using a controlled flow of hot air.

Thus, with this method, only the identifiers for postal use remain apparent on the mailpieces that are handed over to the postal authority which then has no difficulty in processing them, while the presence of the other identifiers, before they are erased, enables the sender to satisfy in-house requirements.

Advantageously, said controlled flow of hot air is hot air extracted from said franking machine.

Said marking may be performed by ink jet printing or by hand and said identifiers may be bar codes having one or two dimensions, handwritten markings, or indeed alphanumeric markings. Said identifiers may be read and interpreted by an optical reader system.

The present invention also provides a system for processing mailpieces, which system comprises a franking machine followed by a mailpiece-receiving module designed to receive said mailpieces once they have been franked, each of said mailpieces bearing identifiers for postal use and identifiers other than for postal use marked in a heat-sensitive ink, wherein said mailpiece-receiving module is provided with erasure means for erasing said identifiers other than for postal use by heating said mailpiece to above a predetermined temperature, using a controlled flow of hot air.

Advantageously, said erasure means comprise blower means for blowing hot air extracted from said franking machine.

Said mailpiece-receiving module is also provided with a first temperature sensor for checking that said predetermined temperature has indeed been reached. It may also be provided with one or more heater resistors for reaching said predetermined temperature that is necessary to said erasing of said identifiers other than for postal use on the first mailpieces franked by said franking machine.

Preferably, it is also provided with air extraction means for accelerating the cooling of the mailpieces once said erasing has been achieved, and with a second temperature sensor for checking the cooling temperature reached once said erasing has been achieved.

Said mailpiece-receiving module may also be provided with stationary shut-off means and with moving shut-off means for acting, as a function of the thicknesses of said mailpieces fed into said module, to close off a mailpiece-feed slot as snugly as possible around the mailpiece, and thus to limit heat loss.

Advantageously, it may also be provided with two enclosures, namely a heating enclosure and a cooling enclosure.

BRIEF DESCRIPTION OF THE DRAWINGS

The characteristics and advantages of the present invention appear more clearly from the following description given by way of non-limiting indication and with reference to the accompanying drawing, in which:

FIG. 1 is a diagrammatic perspective view of a mail handling system that incorporates a mail-receiving module and that makes it possible to implement the method of the invention;

FIGS. 2 and 3 are respectively a plan view and a side view of the mail handling system of FIG. 1; and FIG. 4 is an end view of the mail-receiving module.

DETAILED DESCRIPTION OF A PREFERRED EMBODIMENT

FIG. 1 is a simplified perspective view of a conventional mail handling system. As is known, going from upstream to downstream in the direction in which the mailpieces 10 advance (each of the envelopes containing one or more documents, some of which might have been folded upstream in a document folder and envelope stuffer module), said conventional mail handling system comprises: a mailpiece feed module 12 designed to receive a stack of mailpieces that are typically constituted by mixed mail (i.e. by mailpieces of different sizes and weights), and to select and convey said mailpieces one-by-one, and a print module 14 (the franking machine or "postage meter" proper) designed to print a postal imprint on each of the mailpieces selected one-by-one in this way.

Increasingly frequently and particularly in the context of the present invention, said mail handling system advantageously further comprises an optical read module 16 provided with a "contact" linear sensor (not shown) and disposed, for example, upstream from the print module 14, which optical read module is associated with bar code recognition and/or optical character recognition (OCR) software for the purpose of acquiring digital images of the mailpieces, and more precisely of any identifiers that the mailpieces might bear.

As shown in FIG. 2, and as stated in the introduction, independently of the subsequently printed postage imprint 10A, each of the mailpieces 10A bears identifiers for the sender's in-house use, which identifiers are pre-printed at the manufacturing stage or are printed in a prior processing stage (e.g. at the folding and stuffing stage), and are designed, for example, to make it possible to compute the franking amount automatically (such as the identifier 10B relating to the format of the mailpiece), or to assign the calculated amount automatically to a determined department of the sender (e.g. the identifier 10C). It is also possible for identifiers to be marked on the mailpieces by hand for specific uses, such as the letter R marked by the sender department for the purpose of informing the mail department that the mailpiece in question is to be sent by registered mail.

These identifiers that make it possible to facilitate processing or using the mail at the sender's franking machine are read and interpreted at the optical read module 16 (or indeed by the operator of the machine), but they are no longer of any use once the postal imprint is printed by the print module 14 and once the mailpiece has been handed over to the postal authority.

That is why, in accordance with the invention, it is proposed to print such identifiers that are for the sender's use only by using erasable ink of the temperature-sensitive type and by erasing the heat-sensitive ink once the postal imprint has been printed, at a mailpiece-receiving module 18 disposed at the outlet of the print module 14 and organized around a box that is substantially impermeable to the outside air and in an internal zone of which a predetermined temperature prevails that is sufficient to enable said identifiers to be erased and to make this erasure irreversible at ambient temperature. The erasure temperature depends on the heat-sensitive ink that is used. Thus, for example, for an ink that is of the friction pen ink type, said temperature is typically of the order of 65° C.

As shown in FIGS. 2 and 3, this module that is substantially rectangular block shaped has two distinct and adjacent zones, namely an accumulation and heating zone 180 for accumulating and heating franked mailpieces, in which zone hot air flows in controlled manner, and a cooling zone 182 for cooling said mailpieces and that succeeds the accumulation and heating zone, a conveyor belt 184 disposed at the base of the module transferring the mailpieces from one zone to the other. The first zone 180 is constituted by a first enclosure 180 defined at its bottom by the conveyor belt and into which the mailpieces fall after being ejected one-by-one from the print module 14 and on being fed into said enclosure via an inlet slot 180A disposed at the same height as the outlet slot of the franking machine, and constituting the inlet slot of the module. The second zone 182 is constituted by a second enclosure also defined at its bottom by the conveyor belt, and having, in mutually facing manner, an inlet gate 182A forming the end wall of the first enclosure and an outlet gate 182B constituting the end wall and the outlet gate of the module.

In addition to having drive means (roller 180B) for accompanying the movement of the mailpieces, and stationary and moving shut-off means 180C and 180D for acting, as a function of the thicknesses of the mailpieces, to close off the inlet slot 180A as snugly as possible around the mailpiece (see FIG. 4), thereby limiting heat loss through said inlet slot, the first enclosure 180 also has blower means 186 for blowing therein hot air taken in the example shown via a duct 140 at the franking machine (but naturally it is quite possible for the hot air to be taken externally to and independently from the franking machine), that machine having electromagnetic components (motors, pump, fan, internal power supply, electronic cards, etc.) that dissipate a large amount of heat (typically, the operating temperature of the electronic components is about 85° C.) that can thus advantageously be recovered for this use. A temperature sensor 188 disposed in said first enclosure makes it possible to guarantee that the temperature inside the enclosure is regulated appropriately around a predetermined temperature (that depends on the ink used). In order to enable the franking machine to operate effectively as soon as it is switched on, i.e. even though its components have not yet reached their operating temperature and thus have not yet reached a temperature sufficient to erase the identifiers, it can be advantageous to provide one or more heater resistors 190 in said first enclosure so as to reach the temperature necessary for such erasure more quickly and as soon as the first mailpieces are franked.

The second enclosure 182 is advantageously provided with air extraction means 192 for cooling the mailpieces as quickly as possible by extracting the hot air that is present in said second enclosure. A temperature sensor 194 disposed in the enclosure makes it possible to check the temperature reached inside the enclosure in order to decide when to open it.

The method of the invention comprises various stages, some of which take place successively and some of which take place simultaneously. The franking is generally performed in batches, the operator placing the first batch of mailpieces in the feed module 12, and the print module 14 printing the postal imprint on each mailpiece of the batch. Once franked, the mailpieces then fall one-by-one into the first enclosure 180 without the postal imprint being smudged. The roller 180B is spaced apart from the longitudinal referencing wall by a distance at least equal to the width of a postal imprint, and the stationary shut-off means 180C are also set back slightly from the referencing top wall. At the same time as the franking process that continues on the entire batch of mailpieces (or until the first enclosure is filled completely), the hot air blower system 186 is actuated so as to enable the predetermined temperature to be reached inside said first enclosure, which temperature is the temperature necessary for erasing the identifiers for in-house use present on the mailpieces piling up inside the enclosure. Once said temperature has been reached and has been maintained for a length of time (depending on the type of the ink used) that is sufficient for guaranteeing the erasure, the conveyor belt is switched on, thereby enabling the mailpieces to be fed into the second enclosure 182 whose inlet gate 182A is then opened (by suitable control means 196) in order to receive them. Once the mailpieces are in position inside the second enclosure, the conveyor belt is switched off, the inlet gate of the box is closed, and the air extraction system can then be switched on in order to accelerate the cooling of the mailpieces. The operator can then process a second batch of mailpieces by placing them in the feed module and can then proceed with printing of each of the mailpieces of the second batch, which mailpieces end up inside the first enclosure. Meanwhile, the temperature inside the second enclosure falls to ambient temperature or at least down to a temperature that is reasonable for the operator, typically approximately in the range 40° C. to 50° C. Once that temperature is reached, the outlet gate 182B of the second enclosure is opened (by the suitable control means 198) and, if the operator so wishes, said operator can extract the mailpieces without any risk. Otherwise, the first batch will be ejected automatically when the conveyor belt is switched back on again once the second batch has been processed. Once the first batch is in the delivery tray 20, the outlet gate is closed. The inlet gate 182A can then be opened so as to transfer the processed second batch (which will have been pressed against said inlet gate by the movement of the belt) to the second enclosure, and said inlet gate is then closed again once the second batch is in place. In this way, the inlet and the outlet gates are never opened simultaneously so that heat loss is limited.

It should be noted that although in the above description, reference is made to a single conveyor for transferring mailpieces between two enclosures, clearly it is also possible to use two independent conveyors, one for each of the enclosures.

Thus, with the invention, the mailpieces available in the delivery tray bear only the identifiers that are for postal use, and no longer bear any identifiers for in-house use that were printed previously in erasable ink and that, after being read by the optical read module, were used at the latest at the print module.

What is claimed is:

1. A method of processing a mailpiece that bears machine readable identifiers operable to be processed to provide information for postal use and machine readable identifiers operable to be processed to provide information other than for postal use, in which method said identifiers other than for postal use are marked in heat-sensitive ink on said mailpiece prior to it being fed into a franking machine operable to print the machine readable identifier operable to be processed to provide information for postal use, comprising printing a postal imprint of the franking machine, by a separate module on said mailpiece, wherein said identifiers other than for postal use are erased after the process of printing said postal imprint, once said mailpiece has been ejected from said franking machine, by heating said mailpiece to above a predetermined temperature, using a controlled flow of hot air provided by said module.

2. A method according to claim 1, wherein said controlled flow of hot air is hot air extracted from said franking machine.

3. A method according to claim 1, wherein said marking is performed by ink jet printing or by hand.

4. A method according to claim 1, wherein said identifiers are bar codes having one or two dimensions, handwritten markings, or indeed alphanumeric markings.

5. A method according to claim 1, wherein said identifiers are read and interpreted by an optical read system.

6. A system for processing mailpieces, which system comprises a franking machine followed by a mailpiece-receiving module designed to receive said mailpieces once they have been franked, each of said received mailpieces bearing machine readable identifiers operable to be processed to provide information for postal use and machine readable identifiers operable to be processed to provide information other than for postal use marked in a heat-sensitive ink, wherein said mailpiece-receiving module is provided with erasure means operable to erase said identifiers other than for postal use by heating said mailpiece to above a predetermined temperature, using a controlled flow of hot air.

7. A system according to claim 6, wherein said erasure means comprise blower means for blowing hot air extracted from said franking machine.

8. A system according to claim 7, wherein said mailpiece-receiving module is also provided with a first temperature sensor for checking that said predetermined temperature has indeed been reached.

9. A system according to claim 7, wherein said mailpiece-receiving module is also provided with one or more heater resistors for reaching said predetermined temperature that is necessary to said erasing of said identifiers other than for postal use on the first mailpieces franked by said franking machine.

10. A system according to claim 6, wherein said mailpiece-receiving module is also provided with air extraction means for accelerating the cooling of the mailpieces once said erasing has been achieved.

11. A system according to claim 6, wherein said mailpiece-receiving module is also provided with a second temperature sensor for checking the cooling temperature reached once said erasing has been achieved.

12. A system according to claim 6, wherein said mailpiece-receiving module is also provided with stationary shut-off means and with moving shut-off means for acting, as a function of the thicknesses of said mailpieces fed into said module, to close off a mailpiece-feed slot as snugly as possible around the mailpiece, and thus to limit heat loss.

13. A system according to claim 6, wherein said mailpiece-receiving module is also provided with two enclosures, namely a heating enclosure and a cooling enclosure.

* * * * *